UNITED STATES PATENT OFFICE.

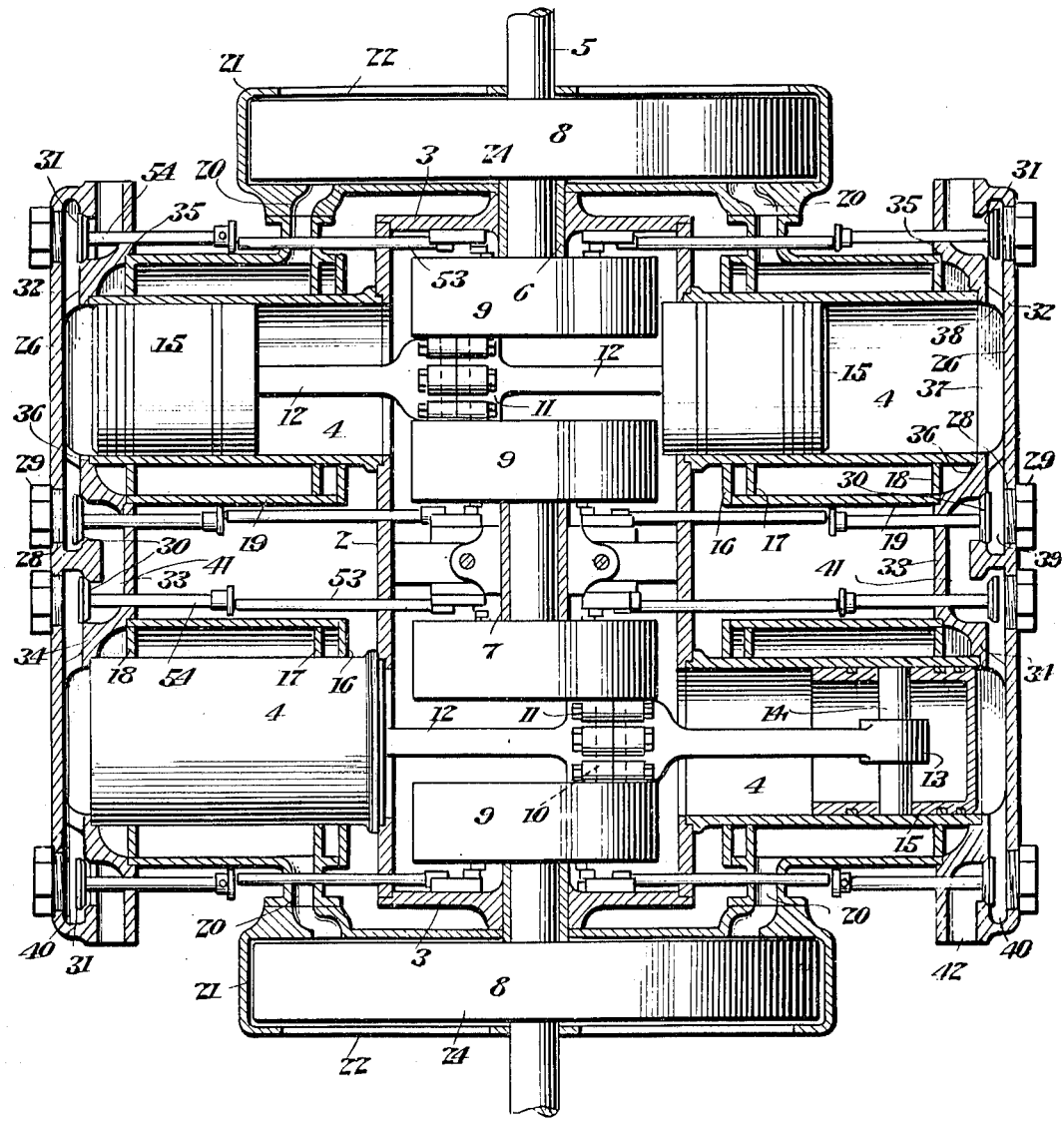

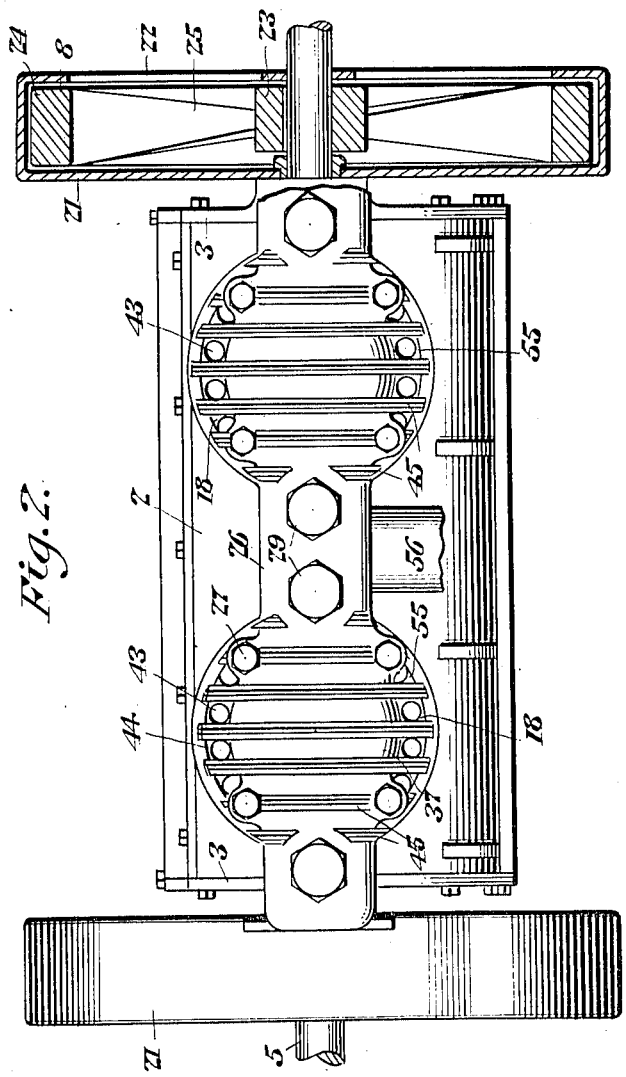

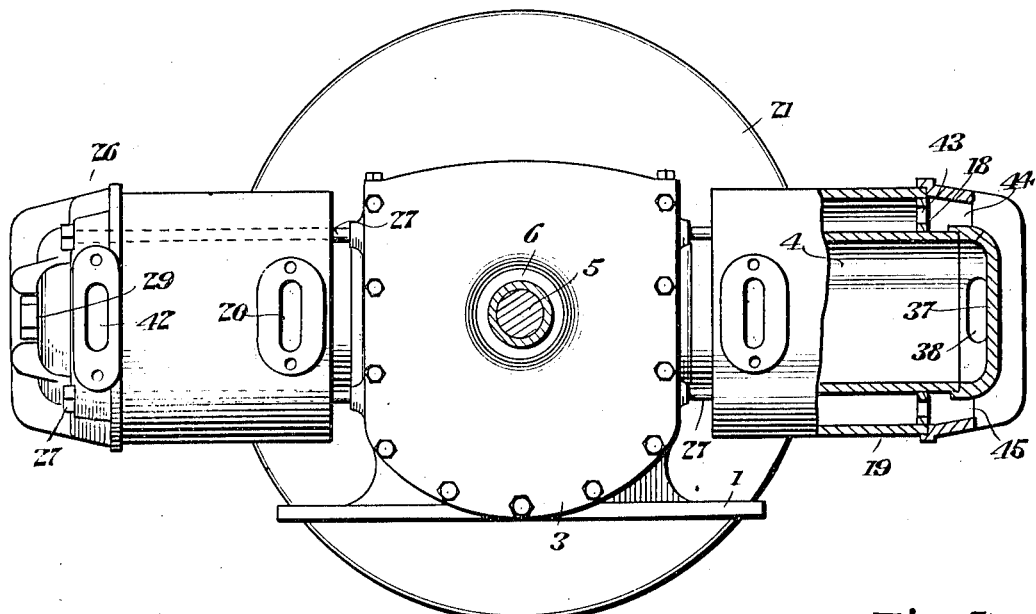

BENJAMIN H. DAVIDSON, OF TAMPA, FLORIDA, ASSIGNOR OF ONE-HALF TO W. H. KENDRICKS, OF HILLSBOROUGH COUNTY, FLORIDA.

INTERNAL-COMBUSTION ENGINE.

1,270,124.  Specification of Letters Patent.  Patented June 18, 1918.

Application filed January 23, 1917. Serial No. 144,032.

*To all whom it may concern:*

Be it known that I, BENJAMIN H. DAVIDSON, a citizen of the United States, residing at Tampa, in the county of Hillsborough and State of Florida, have invented new and useful Improvements in Internal-Combustion Engines, of which the following is a specification.

This invention relates to internal combustion engines of the horizontal opposed four cycle type, the main object of the invention being to provide novel means for efficiently cooling the engine by means of air which passes with considerable velocity around the cylinder heads and cylinder walls, the means for enforcing the continuous movement of the air being incorporated in the engine itself and the velocity of the air being varied in accordance with the speed of rotation of the engine, the increase in the velocity and volume of air varying in accordance with the number of explosions and impulses.

A further object of the invention is to provide in connection with adjacent cylinders, a common cylinder head of novel construction and relation to the body or main casting of the engine, said cylinder head being formed with intake and exhaust passages for the explosive mixture and carrying the intake and exhaust valves, and being also formed with air passages and air inlets which communicate with the air jackets around the cylinders when the cylinder head is in its applied position.

A further object in view is to provide a compact arrangement and construction of valve operating mechanism embodying a minimum number of parts and contained as a whole entirely within the body of the engine, the initial valve actuating elements being contained within the crank case.

With the above and other objects in view, the invention consists in the novel construction, combination and arrangement of parts, herein fully described, illustrated and claimed.

In the accompanying drawings;—

Figure 1 is a horizontal section taken on the diametrical line of the cylinders and showing certain parts in elevation.

Fig. 2 is a side elevation of the engine with parts broken away in section.

Fig. 3 is an end elevation of the engine with parts broken away in section.

Fig. 4 is a face view of one of the cam plates.

Fig. 5 is a diametrical section through the same.

Fig. 6 is a detail view of the inner end of one of the push rods.

The engine contemplated in this invention, under the preferred embodiment thereof, comprises a base 1 having formed integrally therewith a crank case 2 which is generally cylindrical as indicated in the drawings and which has detachable heads 3 at opposite ends thereof.

The cylinders 4 have their longitudinal axes disposed in line with each other and in the horizontal plane of the crank shaft 5 which extends centrally through the crank case and is journaled in the end crank shaft bearings 6 and also in a center bearing 7.

Fast on the crank shaft 5 at opposite ends of the crank case are fly-wheels 8 and fast on said crank shaft within the crank case are crank members or slabs 9 each in the form of a wide faced disk, adjacent disks being connected in pairs by crank pins 10 around which are disposed the connecting rod bearings 11. One of the bearings 11 is bifurcated as shown in Fig. 1 so as to straddle the adjacent connecting rod bearing lying between the branches of the bifurcated bearing so that the thrust of the connecting rods 12 is equally distributed to prevent cramping of said bearings. Each connecting rod 12 carries at its outer end a wrist pin bearing 13 which is journaled on the wrist pin 14 of the respective piston 15. Under the arrangement just described, oppositely disposed pistons reciprocate simultaneously in the same direction in their respective opposed cylinders.

Each of the cylinders 4 is encircled by a plurality of air jacket supporting and holding rings or flanges 16, 17 and 18 and these rings are preferably formed as integral parts of the cylinder. 19 represents a cylindrical air jacket which surrounds the respective cylinder and is attached to and supported by the rings 16, 17 and 18. Each jacket 19 is formed in the outer side thereof with an air outlet 20 to which is bolted or otherwise fastened a fly-wheel housing 21, the latter having large openings 22 in the outer wall thereof to give ample vent to the air drawn through the outlets 20 of oppositely located air jackets. Each fly-wheel, as shown in Fig. 2, comprises a hub 23 fast on the crank shaft 5 and a heavy rim 24 and between said hub and rim there are suction fan blades 25 pitched at any suitable angle to create a strong suction which will draw cool air through the jackets surrounding the cylinders, air being admitted to said jackets through the cylinder head blocks as will hereinafter appear.

A cylinder head block 26 is employed in connection with the cylinders lying at the same side of the crank shaft as indicated in Fig. 1. Each cylinder head block is formed with holes to receive stud bolts 27 by means of which it is fastened securely and tightly against the outer ends of the cylinder walls 4 and the air jackets 19. It is also formed with threaded openings 28 to receive the usual detachable blocks 29 which give access to the intake and exhaust valves 30 and 31, respectively. The head block comprises an outer wall 32, an inner wall 33 and an intermediate wall 34. The inner wall 33 is formed with an annular rabbet 35 to receive and fit the outer edge of the air jacket 19. The intermediate or off-set wall 34 is formed with an annular rabbet 36 to receive and fit the outer edge of the adjacent cylinder wall 4. Tight joints are thus formed between each cylinder head block and the cylinders adjacent thereto and also the air jackets adjacent thereto. Each head block is also formed with a cylinder head wall 37 for each cylinder at that side of the engine and the head wall 37 is formed with lateral circumferentially elongated inlet and exhaust ports 38 which communicate with intake valve chambers 39 and exhaust valve chambers 40, the head being further provided with an intake cavity 41 adjacent to the center of the head, and exhaust passages 42 at opposite ends of the head block.

The outer ring 18 surrounding each cylinder 4, is formed, as shown in Fig. 2, with a circular series of air inlet ports 43 and adjacent to the outer end of each cylinder, the head block is formed with air inlet orifices 44 and 55 and also provided with outwardly extending webs or fins 45, some of which bridge the orifices just referred to and reinforce the block where it would otherwise be weakened by the formation of said orifices. By reason of the construction just described, fresh cool air is drawn by the action of the suction blades in the fly-wheel 8 directly against the head walls 37 of the cylinders and through the ports 43 where it passes through the air jackets 19 and through the outlets 20 into the fly-wheel housing from which it is forced by the action of the blades 25.

In connection with each of the crank members 9, I employ a cam plate 46, said plate being secured to one side of the member 9 and being formed with a cam groove as shown in Figs. 4 and 5. This cam groove comprises an outer run 47 and an inner run 48. These runs merge or intersect each other at the point 49. Arranged to travel in the runs 47 and 48, first in one run and then in the other, is an arcuate or crescent shaped shoe 50 which is carried by a post or pivot 51 journaled in a bearing opening 52 in the inner end of a push rod 53. Two oppositely located push rods 53 are used in conjunction with each cam plate 46 as shown in Fig. 1 and each push rod coöperates with the stem 54 of one of the intake or exhaust valves, each of which is held to its seat by means of the push rods and valves and the operating means therefor are clearly indicated in Fig. 1, the special push rod actuating means being shown in the detail views, Figs. 4, 5 and 6.

From the foregoing description taken in connection with the accompanying drawings it will now be understood that, due to the action of the suction fans contained within the fly-wheels at opposite ends of the crank case, cool air is drawn over the cylinder heads and through the cylinder jackets at a velocity proportionate to the speed of the engine and the number of explosions, the velocity of the air being primarily governed by the pitch given to the fan blades 25. When a cylinder head block is removed and the blocks 29 detached, access is obtained to the valves, to the inner surfaces of the cylinder head walls, the interior of each cylinder and to the air jackets, enabling all accumulations to be easily removed. The valve actuating mechanism including the valves is contained wholly within the frame or body of the engine and in fact there are no moving parts on the outside of the engine body with the exception of the fly-wheels which are incased in their respective housings. Any suitable form of carbureter may be employed in connection with the engine and attached to a manifold 56 which discharges into the chambers 41 at opposite sides of the engine.

I claim:—

1. In an internal combustion engine of the horizontal opposed type, a crank case, batteries of cylinders extending outwardly from said crank case, an air jacket surrounding each cylinder, a crank shaft extending at both ends beyond said crank case, wheels fast on said crank shaft at opposite ends of the crank case and each embodying lateral draft air suction blades, a housing for each of said wheels having communication with a plurality of said air jackets, and cylinder head blocks in communication with said air jackets and formed with air inlet orifices.

2. In an internal combustion engine of the horizontal opposed type, a crank case, batteries of cylinders extending outwardly from said crank case, an air jacket surrounding each cylinder, a crank shaft extending at both ends beyond said crank case, wheels fast on said crank shaft at opposite ends of the crank case and each embodying lateral draft air suction blades, a housing for each of said wheels having communication with a plurality of said air jackets, and cylinder head blocks in communication with said air jackets and formed with air inlet orifices arranged to admit air directly against the cylinder head walls.

3. In an internal combustion engine of the horizontal opposed type, a crank case, batteries of cylinders extending outwardly from said crank case, an air jacket surrounding each cylinder, a crank shaft extending at both ends beyond said crank case, wheels fast on said crank shaft at opposite ends of the crank case and each embodying lateral draft air suction blades, a housing for each of said wheels having communication with a plurality of said air jackets, and cylinder head blocks in communication with said air jackets and formed with air inlet orifices arranged to admit air directly against the cylinder head walls, each cylinder head block being rabbeted to receive the outer edges of the adjacent cylinders and being also rabbeted to receive the outer edges of the air jackets of said cylinders.

4. In an internal combustion engine of the horizontal opposed type, a crank case, batteries of cylinders extending outwardly from said crank case, an air jacket surrounding each cylinder, a crank shaft extending at both ends beyond said crank case, wheels fast on said crank shaft at opposite ends of the crank case and each embodying lateral draft air suction blades, a housing for each of said wheels having communication with a plurality of said air jackets, cylinder head blocks in communication with said air jackets and formed with air inlet orifices, each cylinder head block being formed with gas inlet and exhaust passages, and inlet and exhaust valves mounted in and carried by said head block and controlling said intake and exhaust passages.

5. In an internal combustion engine of the horizontal opposed type, a crank case, batteries of cylinders extending outwardly from said crank case, an air jacket surrounding each cylinder, a crank shaft extending at both ends beyond said crank case, wheels fast on said crank shaft at opposite ends of the crank case and each embodying lateral draft air suction blades, a housing for each of said wheels having communication with a plurality of said air jackets, cylinder head blocks in communication with said air jackets and formed with air inlet orifices, intake and exhaust valves mounted in and carried by said head blocks and having inwardly extending stems, push rods for said stems having their inner ends arranged in the crank case, a cam plate having a fixed relation to the crank shaft, and shoes having a pivotal mounting on the inner ends of oppositely extending push rods, said shoes coöperating with said cam plate.

6. In an internal combustion engine of the horizontal opposed type, a crank case, batteries of cylinders extending outwardly from said crank case, an air jacket surrounding each cylinder, a crank shaft extending at both ends beyond said crank case, wheels fast on said crank shaft at opposite ends of the crank case and each embodying lateral draft air suction blades, a housing for each of said wheels having communication with a plurality of said air jackets, cylinder head blocks in communication with said air jackets and formed with air inlet orifices, intake and exhaust valves mounted in and carried by said head blocks and having inwardly extending stems, push rods for said stems having their inner ends arranged in the crank case, a cam plate having a fixed relation to the crank shaft, and shoes having a pivotal mounting on the inner ends of oppositely extending push rods, said shoes coöperating with said cam plate, said cam plate being formed with a cam groove having outer and inner runs which intersect each other at one point and in which said shoes travel.

7. In an internal combustion engine of the horizontal opposed type, a crank case, batteries of cylinders extending outwardly from said crank case, an air jacket surrounding each cylinder, a crank shaft extending at both ends beyond said crank case, wheels fast on said crank shaft at opposite ends of the crank case and each embodying lateral draft air suction blades, a housing for each of said wheels having communication with a plurality of said air jackets, cylinder head blocks in communication with said air jackets and formed with air inlet orifices, and fins projecting from the outer face of each head block and bridging the air inlet orifices therethrough.

In testimony whereof I affix my signature.

BENJAMIN H. DAVIDSON.